US008011781B2

(12) United States Patent
Taniuchi et al.

(10) Patent No.: US 8,011,781 B2
(45) Date of Patent: Sep. 6, 2011

(54) METHOD OF PRODUCING RECORDED PRODUCT (PRINTED PRODUCT) AND IMAGE FORMING APPARATUS

(75) Inventors: Hiroshi Taniuchi, Yokohama (JP); Akihiro Mouri, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 997 days.

(21) Appl. No.: 11/755,347

(22) Filed: May 30, 2007

(65) Prior Publication Data

US 2008/0032072 A1 Feb. 7, 2008

(30) Foreign Application Priority Data

Jun. 15, 2006 (JP) ................................ 2006-166452

(51) Int. Cl.
*B41J 2/01* (2006.01)
*B41J 2/175* (2006.01)
*G01D 11/00* (2006.01)

(52) U.S. Cl. ............ 347/103; 347/101; 347/88; 347/99

(58) Field of Classification Search .................. 347/103, 347/101, 88, 99
See application file for complete search history.

(56) References Cited

U.S. PATENT DOCUMENTS 5,132,706 A * 7/1992 Yuasa et al. ................ 346/140.1
5,389,958 A * 2/1995 Bui et al. ...................... 347/103
6,059,407 A 5/2000 Komatsu et al. .............. 347/103
6,086,197 A * 7/2000 Kubota et al. .................. 347/96
6,126,280 A * 10/2000 Hashimoto et al. ........... 347/101
6,196,674 B1 * 3/2001 Takemoto ..................... 347/103
6,257,716 B1 * 7/2001 Yanagawa et al. ............ 347/102
6,386,683 B1 * 5/2002 Muroi et al. .................... 347/55
6,540,344 B2 4/2003 Kashiwazaki et al. ........ 347/100
6,648,468 B2 * 11/2003 Shinkoda et al. ............. 347/103
6,682,189 B2 * 1/2004 May et al. ...................... 347/103
6,860,593 B2 3/2005 Kashiwazaki et al. ........ 347/100
7,036,920 B2 * 5/2006 Rousseau et al. ............. 347/103
7,055,944 B2 * 6/2006 Konishi ........................ 347/100
7,281,790 B2 10/2007 Mouri et al. .................. 347/103
7,661,809 B2 * 2/2010 Taniuchi et al. .............. 347/103
2004/0182270 A1 * 9/2004 Wiedemer et al. ............ 101/465
2005/0110855 A1 5/2005 Taniuchi et al. .............. 347/103

FOREIGN PATENT DOCUMENTS

JP 5-330035 12/1993
JP 7-089067 A 4/1995
JP 2002-116630 A 4/2002
JP 3428689 5/2003
JP 2004-114675 A 4/2004
JP 2005-153187 A 6/2005

* cited by examiner

*Primary Examiner* — Stephen Meier
*Assistant Examiner* — Leonard Liang
(74) *Attorney, Agent, or Firm* — Fitzpatrick, Cella, Harper & Scinto

(57) ABSTRACT

An embodiment of the present invention provides a method of forming an image, which allows a high quality image to be formed on an intermediate transfer body including a surface layer with an ink-repelling property, and then to be transferred at a high transfer rate, and provides an image forming apparatus therefor. In the embodiment of the present invention, an ink image is formed on the intermediate transfer body, on the surface of which an oil and a water-soluble surfactant having surface tension in a range between more than 0 times and not more than 1.1 times of that of the oil are present. Subsequently, the formed ink image is transferred to a recording medium.

16 Claims, 4 Drawing Sheets

METHOD OF PRODUCING RECORDED PRODUCT (PRINTED PRODUCT) AND IMAGE FORMING APPARATUS

BACKGROUND OF THE INVENTION

1. Field of the Invention

The present invention relates to a method of producing a recorded product (printed product) and an image forming apparatus, and in detail to a method of producing a recorded product (printed product) and an image forming apparatus for increasing the degree of freedom for selecting recording media in inkjet recording.

2. Description of the Related Art

In recent years, it is desired to form high quality images on a wide variety of recording media irrespective of ink absorption in an ink-jet recording method. Various kinds of methods have been proposed for this purpose. In particular, a transfer type ink-jet method has been paid attention to. In this method, an image is temporarily formed on an intermediate transfer body, and then the image is transferred to a recording medium by changing the physical properties of the ink.

In Japanese Patent Laid-Open No. Hei. 5-330035, the method is proposed in which a hot-melt ink is ejected on an intermediate transfer body by heating the ink-jet head and the ink supply system, and then the ink is fixed with the heat being released. However, in order to optimize the phase change characteristic (solid-liquid phase change caused by heat) of the ink, the ink which contains an extremely large amount of binder relative to a coloring agent must be used. Accordingly, a large amount of the ink needs to be provided to obtain the desired concentration thereof. As a result, the quality of an image is reduced due to an increased thickness of the ink on the output image. In addition, since an ink which is solid at normal temperature is used, it is necessary to heat and melt the ink in an ink flow path at the time of start-up, and it takes time to output an image. Furthermore, the equipment is always heated during the operation, and thereby a huge amount of energy is required.

A large number of transfer-type ink-jet recording methods are proposed for a water-based ink which is considered to be environmentally the most preferable as an ink-jet ink. It is preferable to use the intermediate transfer body having low surface energy for stably transferring the ink image formed on the intermediate transfer body to the recording media. On the other hand, the intermediate transfer body having low surface energy has a property incompatible with the above, i.e., the property that it tends to repel the water-based ink, thus making it difficult to form an image. The reason why an intermediate transfer body having the low surface energy is not practically manufactured is that the above problems have not been solved fundamentally.

In Japanese Patent Publication No. 3,428,689, devised is the method for improving the affinity between water-based ink and the surface of the intermediate transfer body which tends to repel the water-based ink, by applying the surfactant having an HLB (hydrophile-lipophile balance) value of 7 to 8 on the surface of the intermediate transfer body.

However, in the method described in Japanese Patent Publication No. 3,428,689, when a highly ink-repelling material is used for the surface of the intermediate transfer body in order to transfer an ink image formed on the intermediate transfer body to a recording medium at a high transfer rate, the applied surfactant itself is repelled in some cases. In other words, if a highly lipophilic surfactant is used as a surfactant, the above repelling property is reduced. However, in Japanese Patent Publication No. 3,428,689, since the surfactant having an HLB value of 7 to 8 is used, the above repelling occurs. Accordingly, the above surfactant is insufficient to achieve a highly fine image such as photograph.

As described above, in ink-jet recording, the method might be effective in which a surfactant is applied on an intermediate transfer body to reduce the repellation of ink. However, there are still problems to be solved in order to achieve both the reduction of the repellation of ink and the high transfer rate, thus obtaining a highly fine image such as photograph.

SUMMARY OF THE INVENTION

It is an object of the present invention to provide a method of producing a recorded product (printed product) which allows a high quality image to form on an intermediate transfer body including a surface layer with an ink-repelling property, and then to be transferred at a high transfer rate, as well as to provide an image forming apparatus therefor.

In first aspect of the present invention, a method of producing a recorded product comprises the steps of: forming an ink image on an intermediate transfer body having a surface where an oil and a water-soluble surfactant having surface tension not more than that of the oil are present; and transferring the formed ink image to a recording medium.

In second aspect of the present invention, a method of producing a recorded product comprises the steps of: forming an ink image on an intermediate transfer body having a surface where an oil and a water-soluble surfactant having surface tension not more than 1.1 times of that of the oil are present; and transferring the formed ink image to a recording medium.

In third aspect of the present invention, a method of producing a recorded product comprises the steps of: forming an ink image on an intermediate transfer body including a surface layer containing an oil and a water-soluble surfactant having surface tension not more than that of the oil, by causing a recording head to provide an ink to the surface layer of the intermediate transfer body; and transferring the ink image formed on the intermediate transfer body to a recording medium, wherein in the forming step, the ink is provided from the recording head to the surface layer in a state where the oil and the water-soluble surfactant are present on a surface thereof.

In fourth aspect of the present invention, a method of producing a recorded product comprises the steps of: forming an ink image on an intermediate transfer body including a surface layer containing an oil and a water-soluble surfactant having a surface tension not more than 1.1 times of that of the oil, by causing a recording head to provide an ink to the surface layer of the intermediate transfer body; and transferring the ink image formed on the intermediate transfer body to a recording medium, wherein in the forming step, the ink is provided from the recording head to the surface layer in a state where the oil and the water-soluble surfactant are present on a surface thereof.

In fifth aspect of the present invention, an image forming apparatus comprises: an intermediate transfer body including a surface layer containing an oil and a water-soluble surfactant having a surface tension not more than 1.1 times of that of the oil; a forming means for forming an ink image on the intermediate transfer body; and a transfer section which transfers the formed ink image to a recording medium, wherein the forming means forms the ink image on the surface layer in a state where the oil and the water-soluble surfactant are present on a surface thereof.

In sixth aspect of the present invention, an image forming apparatus comprises: an intermediate transfer body including a surface layer containing an oil and a water-soluble surfactant having a surface tension not more than that of the oil; a forming means for forming an ink image on a surface layer of the intermediate transfer body; and a transfer section which transfers the formed ink image to a recording media, wherein the forming means forms the ink image on the surface layer in a state where the oil and the water-soluble surfactant are present on a surface thereof.

In seventh aspect of the present invention, an intermediate transfer body on which an ink image is formed, comprises: a surface layer containing an oil and a water-soluble surfactant having a surface tension not larger than that of the oil, wherein the oil and water-soluble surfactant bleed out on the surface of the surface layer, thereby being present on the surface.

In eighth aspect of the present invention, an intermediate transfer body on which an ink image is formed, comprises: a surface layer containing an oil and a water-soluble surfactant having a surface tension not larger than 1.1 times of that of the oil, wherein the oil and water-soluble surfactant bleed out on the surface of the surface layer, thereby being present on the surface.

As a means of forming an ink image on the intermediate transfer body according to the present invention, the ink-jet method is preferably used. The ink-jet method is advantageous in forming an image on an intermediate transfer body having high repelling property because it allows the placement of the droplets of the ink at specified address points without the ink being contacted with the intermediate transfer body.

In the present specification, a "recording medium" is used as a generic designation including not only paper used in general printing equipment but also a wide variety of items which can accept an ink, such as a cloth, aplastic film, a glass, a metal and the like.

According to the present invention, an oil and a water-soluble surfactant having a surface tension not more than 1.1 times of that of the oil are caused to be present on the surface of the intermediate transfer body prior to the formation of an image. Therefore, it is possible to form a high quality image having reduced repelling of ink on the intermediate transfer body, and to transfer the image at a high transfer rate.

Further features of the present invention will become apparent from the following description of exemplary embodiments with reference to the attached drawings.

DESCRIPTION OF THE EMBODIMENTS

With reference to accompanying drawings, the suitable embodiment of the present invention is hereinafter described in detail.

1. Overview Of The Image Forming Apparatus

Figure 1:
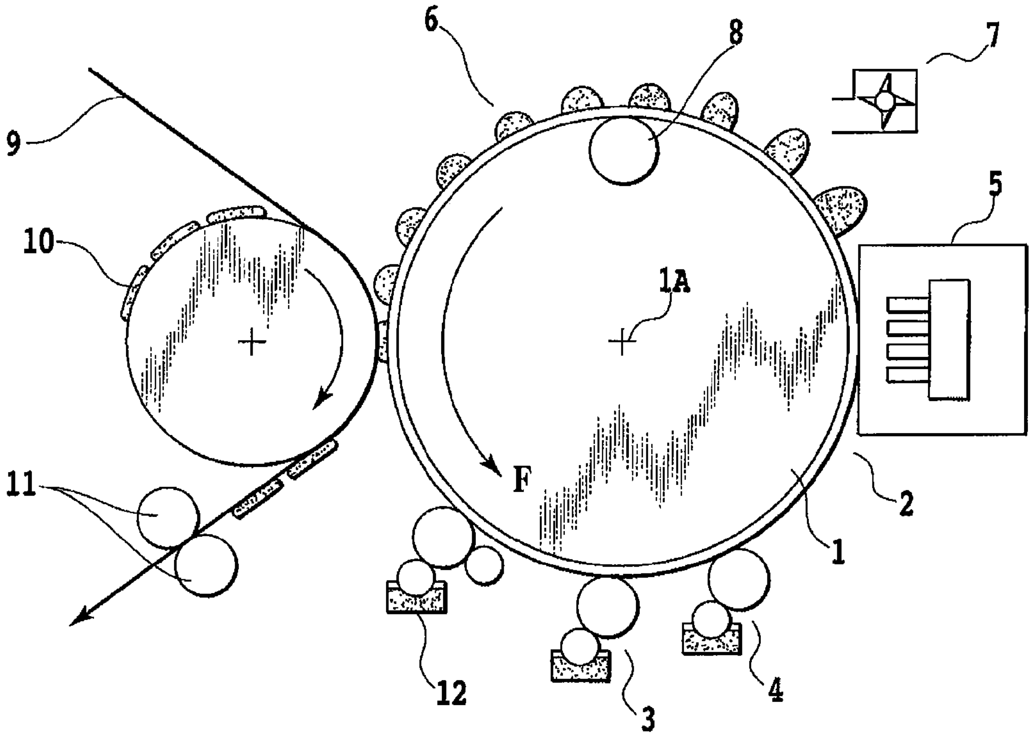
FIG. 1 is a frame format showing schematic configuration of an image forming apparatus according to an embodiment of the present invention.

FIG. 1 is a frame format showing the schematic configuration of an image forming apparatus according to an embodiment of the present invention. In FIG. 1, a reference numeral 1 shows an intermediate transfer body which is rotatably driven around an axis 1A in the direction shown by an arrow F. An oil and a water-soluble surfactant having surface tension in a range between more than 0 times and not more than 1.1 times of that of the oil are previously contained in an elastic layer 2 which is the surface layer of the intermediate transfer body 1. Particularly, it is preferable that an oil and a water-soluble surfactant having a surface tension not more than that of the oil be contained in the surface layer of the intermediate transfer body 1. A reference numeral 3 in FIG. 1 designates application device for applying a surfactant, which can suppress the consumption of the surfactant contained in the intermediate transfer body 1, and which can newly provide another surfactant. A reference numeral 4 designates application device for applying a reaction liquid which reacts with the ink, which can provide a reaction liquid on the intermediate transfer body 1 prior to the formation of an ink image.

A reference numeral 5 designates an ink-jet recording head which can eject an ink in the form of, for example, a droplet, thus forming an image (mirror image) on the surface of the intermediate transfer body 1. Then, by contacting the recorded surface of a recording medium 9 with the image formed on the intermediate transfer body 1, and by applying pressure thereon with a pressure roller 10, the image is transferred and formed on the recording medium 9.

In the image forming apparatus exemplified in FIG. 1, an air-blower type water content removal acceleration device 7 is disposed. The device 7 accelerates the evaporation of liquid component in the ink which constitutes the image on the intermediate transfer body 1. In combination with the device 7 or alternatively, a heating roller 8 for heating the liquid content can also be used in contact with the back surface of the hollow intermediate transfer body 1.

The recording medium 9 on which an image is recorded via the intermediate transfer body 1 as described above, can obtain excellent surface smoothness by pressing the recording medium 9 with a fixing roller 11. When the fixing roller 11 is heated, the toughness of the printed product is instantly obtained.

In the apparatus exemplified in FIG. 1, the intermediate transfer body 1 after an ink image is transferred to the recording medium 9, is cleaned with a cleaning unit 12 at the next stage to prepare for the acceptance of the next image.

In the conventional transfer type ink-jet recording apparatus, it was very difficult to achieve two properties of the formation of a high quality image on the intermediate transfer body and the transfer of an ink image formed on the intermediate transfer body to the recording medium at a high transfer rate. Accordingly, it was difficult to overcome the deterioration of the image quality due to, for example, the amount of the ink absorbed by the recording medium, and consequently to output a highly fine image such as photograph.

In contrast, in an embodiment of the present invention, as also apparent from the embodiment embodied in the above image forming apparatus, it is possible to record a high quality image on a wide variety of media without depending on the amount of the ink absorbed into the recording media. That is, the image formation is possible by effectively exploiting the advantages of the ink-jet recording method having an excellent recording flexibility in which a desired printed product can instantly be obtained.

2. Description Of The Process

The present invention can roughly be classified into a process of producing an intermediate transfer body (hereinafter referred to as a process (a)), and a process of forming an image using the produced intermediate transfer body. Furthermore, the image formation process is divided into a process of forming an image on the intermediate transfer body using the ink-jet recording method (hereinafter referred to as a process (b)), and a process of transferring the ink image formed on the intermediate transfer body 1 to the recording medium 9 (hereinafter referred to as a process (c)). The processes (a) to (c) or the operation means thereof are described below in detail with reference to specific examples.

2.1 Process (a)

This process is a process of producing the intermediate transfer body 1. The intermediate transfer body 1 is provided with an ink image formed thereon by the ink-jet recording head 5, and contacts the recording medium 9 to transfer the ink image thereto. For this reason, the surface layer thereof is preferably made of an elastic material. The increase in the transfer rate of the ink image is important for the steady achievement of a high quality image. The transfer rate of the ink image depends on the physical properties of the intermediate transfer body surface, the ink and the recording media. The repelling property of the intermediate transfer body 1 surface is deeply related to the transfer rate. A term "repelling property" refers to the degree of the difficulty level of adhesion. The surface having a liquid release layer as well as the surface of fluoro resin which is considered as the representative of items having a low surface energy also has high repelling property. Both are preferably used in combination. In the present invention, the former is considered to be more important.

However, if a liquid layer is thick, the ink image floats, thereby the image is distorted. Therefore, when the liquid layer is formed as thinly as possible, the higher quality image is obtained. Taking this point into consideration, elastic materials containing an oil, which are typified by rubber is suitable because many of such elastic materials have a property that a slight amount of oil oozes from the inside to the surface (see, FIG. 4A below). In particular, a silicone rubber is one of the most suitable materials as the elastic layer 2 according to an embodiment of the present invention because the silicone rubber has a low surface energy of the rubber itself and includes the low molecular weight components thereof inside. The silicone rubber includes various types such as a vulcanization type, a single-liquid curing type and two-liquid curing type. Any of them can preferably be used.

As a matter of course, the present invention is not limited to the silicone rubber. In addition to typical rubber materials such as NR, SBR, NBR, CR, IIR, EPDM, CSM, Si, FKM and U, the densely sponge-processed product thereof can be used as the elastic layer 2. The densely formed sponge body of plastics such as PVC, PVA and PU can also be used. The amount of oil component to be included can be controlled by controlling the amount of oil added as a raw material and the amount of oil absorbed after the elastic body is molded. The oil (oil component) to be used is preferably selected in accordance with the used ink. Nevertheless, a silicone oil is the most preferable material in view of the repelling property and physical stability.

Figure 4A:
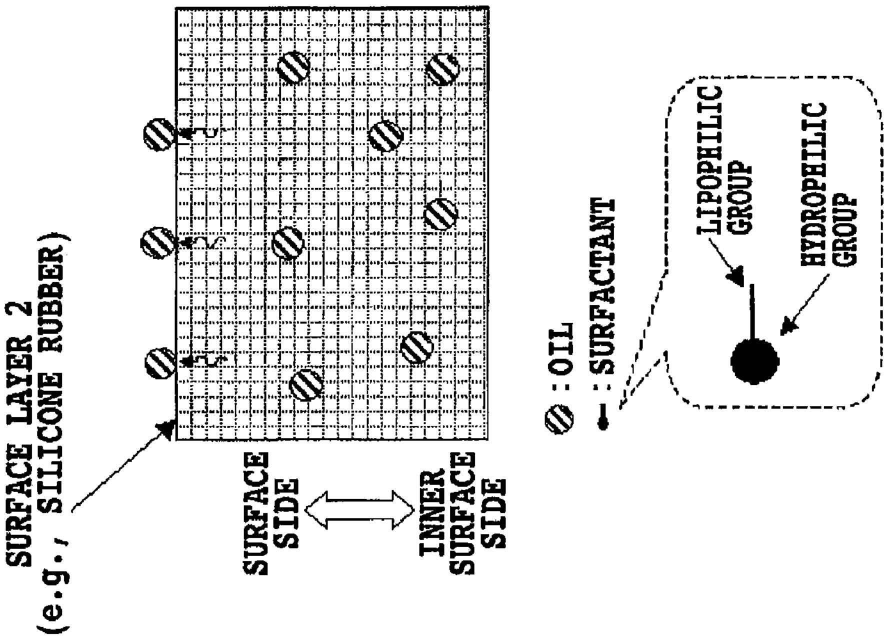
FIGS. 4A to 4C show states where an oil contained in a surface layer of an intermediate transfer body bleeds out on the surface, and where an oil and a water-soluble surfactant contained in a surface layer of an intermediate transfer body bleed out on the surface.

FIG. 4A shows an example of using a common silicone rubber as the surface layer 2, and specifically shows the surface on which the silicone oil contained in the silicone rubber of the surface layer oozes out. As shown in FIG. 4A, the silicone oil which is present inside the silicone rubber bleeds out on the surface. Thereby, a slight amount of the silicone oil is always present on the surface of the silicone rubber, keeping the rubber surface ink-repellent.

However, the surface of such a material particularly tends to repel the water-based ink if not treated, and thereby it is impossible to form an image having no portion on which ink is repelled on the surface of the transfer body if this material is used without any treatment. Therefore, in an embodiment of the present invention, the properties of the surface of an elastic body are modified by adding a water-soluble surfactant to the oil-containing elastic layer 2. That is, the hydrophilic property of the surface of the elastic layer 2 can be enhanced by adding the water-soluble surfactant to the oil-containing elastic body to cause the elastic body to contain the water-soluble surfactant. The "water-solubility" used in an embodiment of the present invention means that a surfactant or a slight amount of the part of the surfactant is dissolved in water. The effect of enhancing the hydrophilic property was experimentally obtained even at a water-solubility of about 100 ppm by mass. Therefore, the surfactant having this level of solubility or more is referred to as water soluble in the present invention. Note that, the controlling of the surface tension of the water-soluble surfactant contained in the elastic layer 2 makes it possible that the oil and also the water-soluble surfactant bleed out on the surface (see, FIG. 4C below).

In an embodiment of the present invention, as an addition method, the method in which an oil and a water-soluble surfactant are added to an elastic body such as a rubber raw material, thereafter kneading the resultant mixture prior to rubberization (vulcanization, curing), and the method in which the oil blended with the water-soluble surfactant is absorbed in the elastic body after the elastic body is molded, can be applied for example. In the above described manner, the elastic layer 2 containing the oil and the water-soluble surfactant is formed.

It is important to select the water-soluble surfactant to be added by corresponding to the oil to be contained. The indication of the selection is a surface tension. It is important that the surface tension of the water-soluble surfactant to be used is equivalent to that of the oil or less. The surface tension of the water-soluble surfactant was measured by the Wilhelmy method using the solution having a water-soluble surfactant concentration of 0.1%. The results of an experiment disclosed that the water-soluble surfactant with the surface tension lower than that of the oil can be used without any problem, that the use of the water-soluble surfactant with the surface tension larger than that of the oil by 5% or more causes an suppressive effect in ink repellency to be drastically reduced, and that the use of the water-soluble surfactant with the surface tension larger by more than 10% would not make the suppressive effect in ink repellency. The "equivalent" indicated here means 10% or less. Specifically, in an embodiment of the present invention, the surface tension of the water-soluble surfactant may be adjust to a value within a range between above 0 times and 1.1 times or less of the surface tension of the oil to be contained.

Here, description will be made of the relationship between the surface tension of the water-soluble surfactant and the above-described suppressive effect on ink repellency with reference to FIG. 4B and FIG. 4C.

Figure 4B:
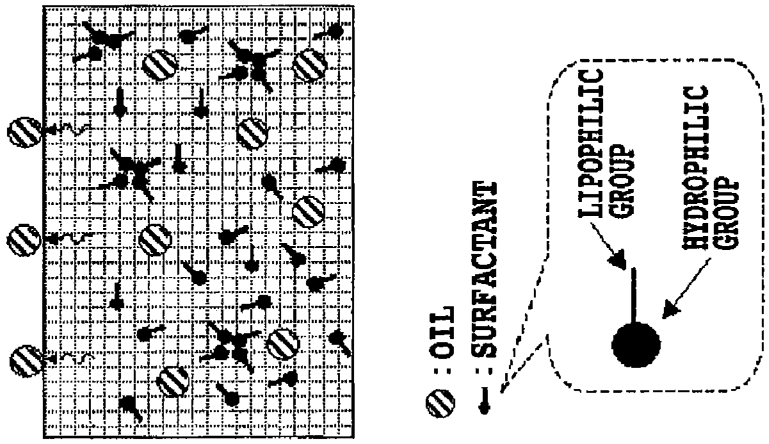

FIG. 4B shows an example which uses a silicone rubber as the surface layer 2, containing the water-soluble surfactant having a surface tension 1.1 times larger than that of the silicone oil. If the surface tension of the water-soluble surfactant is larger than that of the silicone oil, the water-soluble surfactant hardly bonds with the silicone oil. In such a case, as shown in FIG. 4B, the water-soluble surfactant is left inside the silicone rubber, and only the silicone oil bleeds out on the surface. Accordingly, the water-soluble surfactant does not exist on the surface of the surface layer 2, and thereby the suppressive effect on ink repellency is not obtained.

Figure 4C:
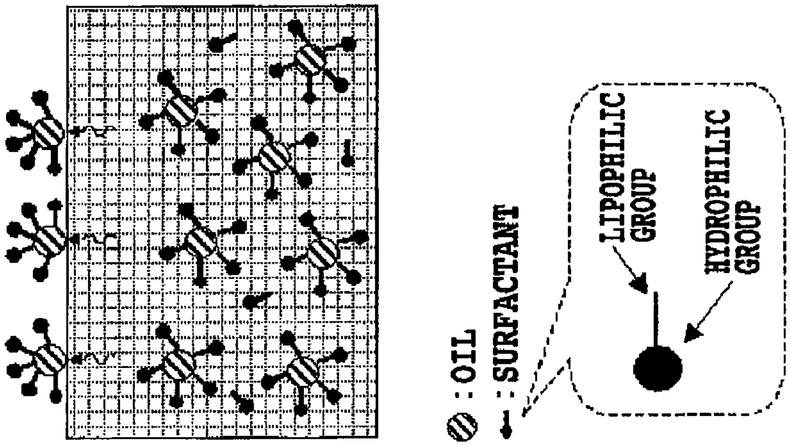

On the other hand, FIG. 4C shows an example which uses a silicone rubber as the surface layer 2, containing the water-soluble surfactant having a surface tension not larger than that of the silicone oil. If the surface tension of the water-soluble surfactant is smaller than that of the silicone oil, the water-soluble surfactant well bonds with the silicone oil. In such a case, as shown in FIG. 4C, the water-soluble surfactant in addition to the silicone oil bleeds out on the surface. Accordingly, the water-soluble surfactant and the silicone oil coexist on the surface of the surface layer 2, and thereby both the suppressive effect on ink repellency produced by the surfactant and the release effect produced by the oil (high transfer rate effect) can be satisfied.

The restriction to the water-soluble surfactant includes only the above condition. The other properties can be freely selected. To be specific, as the water-soluble surfactant, cationic, anionic, nonionic, amphoteric, fluorinated, and silicon surfactants, for example, can be used. In particular, fluorinated surfactants are suitable because the fluorinated surfactants can create very low surface tension. Among them, the one having a perfluoroalkyl group exhibits a notable effect.

In an embodiment of the present invention, it is important to cause the water-soluble surfactant to be present on the surface of the intermediate transfer body in order to obtain the targeted intermediate transfer body with non-ink-repelling property or reduced ink-repelling property. At the same time, it is also important to cause the oil to be present on the surface of the intermediate transfer body in order to obtain a high transfer rate which is another target. As described above, when the above two components are caused to be present on the elastic layer 2 prior to the formation of an image, the ink-repelling property can be reduced by the action of the water-soluble surfactant, and the transfer rate can be increased by the action of the oil.

In an embodiment of the present invention, the relationship between the surface tension of the oil and the surface tension of the water-soluble surfactant which are to be contained is also important. Specifically, in an embodiment of the present invention, it is important to use the water-soluble surfactant having the surface tension smaller than that of the oil to be contained, or the water-soluble surfactant having the surface tension not larger than 1.1 times of that of the oil in a case where the surface tension of the water-soluble surfactant is larger than that of the oil.

The oil and the water-soluble surfactant are necessary to be present on the surface of the intermediate transfer body at the same time. The water-soluble surfactant is caused to properly ooze on the intermediate transfer body together with the oil, as shown in FIG. 4B. In this case, the added water-soluble surfactant has a high affinity with the oil which will ooze, i.e., has a surface tension equivalent to or less than that of the oil. This causes the oil and the water-soluble surfactant to always be present on the surface of the intermediate transfer body 1.

As described above, the oil and the water-soluble surfactant can suitably be present on the surface of the intermediate transfer body 1 by utilizing the relationship between the surface tensions. Thus, an ink image having reduced ink-repelling property can be formed on the intermediate transfer body 1. As a result, this high quality ink image can be transferred at a high transfer rate to the recording medium 9. A highly fine image such as photograph, therefore, can be formed in a high quality.

The rubber hardness degree of the elastic layer 2 is affected by the thickness, hardness and the like of the recording medium 9 which is contacted with the elastic layer 2. It is therefore desired to optimize each of them. In particular, when the elastic layer 2 having an international rubber hardness degree (IRHD) ranging between 10° to 100° is used, it effectively works. Furthermore, the elastic layer 2 having an IRHD ranging between 40° to 80° can be used for almost any kinds of recording papers.

When a recording medium having a large asperity on the surface thereof is used, selection of a low rubber hardness degree allows a recording medium to more precisely follow the elastic layer 2.

A material selected in the above manner is processed to form the intermediate transfer body 1. Elasticity is a necessary property for the surface. The elastic layer 2 is therefore formed on a support having a stable shape to enhance dimensional accuracy.

In FIG. 1, a drum made of a lightweight metal such as an aluminum alloy is used as a support. The intermediate transfer body 1 is constructed by mounting the elastic layer 2 on the surface thereof. However, in the present invention, the construction of the intermediate transfer body 1 is not limited to this formation. For example, a roller-like, belt-like, and sheet-like intermediate transfer bodies can be used. In addition, not only the one which makes linear contact but also a largely elastically deformed material such as a pad used in pad printing can also be used as the intermediate transfer body.

As the surface of the intermediate transfer body, a smooth one is generally considered to be suitable because it provides a highly fine image. In contrast, when a coarse surface is used, a matte-tone image can be created.

In the above embodiment, the elastic layer 2 contains the oil and the water-soluble surfactant. In this case, the contained both components ooze on the surface of the elastic layer 2. This oozing is accelerated with an increase in temperature. Therefore, in an embodiment of the present invention, means of heating the surface of the intermediate transfer body 1, i.e. the elastic layer 2, may be used to accelerate this oozing. Such means is not restricted in the form as long as it is consequently able to heat the elastic layer 2. The means includes a heater disposed such that the support of the intermediate transfer body 1 such as an aluminum alloy is heated, and a heater disposed such that the elastic layer 2 is heated.

In the above embodiment, the oil and the water-soluble surfactant are caused to be present on the surface of the elastic layer 2 by including the oil and the water-soluble surfactant in the elastic layer 2, and by utilizing the action in which these components ooze on the surface of the elastic layer 2. However, it is not essential to contain the above two components. In an embodiment of the present invention, it is important to cause the oil and the water-soluble surfactant to be present at least in the image forming area on the surface (elastic layer 2) of the intermediate transfer body 1, prior to the formation of an image by means of the ink-jet recording head 5. Accordingly, the oil and the water-soluble surfactant may be caused to be present on the surface of the intermediate transfer body 1 by providing the oil and the water-soluble surfactant on the surface prior to the image formation operation. In this case, the above components may be provided by using means such as a roll coater, a spray coater, a blade coater or a recording head. Alternatively, one of the oil and the water-soluble surfactant is contained in the elastic layer 2, and the other component may be provided to the elastic layer 2 prior to the image formation. Furthermore, if the oil component contained in the elastic body sufficiently oozes on the surface of the elastic body without adding another oil, the oil may not separately be added.

2.2 Process (b)

The process (b) is a process of forming an image on the intermediate transfer body 1. In FIG. 1, an image is formed using the ink-jet recording head 5. However, the present invention is not limited to this. The intermediate transfer body of the present invention has ink-acceptance property improved by adding the water-soluble surfactant. Moreover, the intermediate body has a repelling effect provided by the oozing of a slight amount of the oil, and thus can also be utilized in an image forming system using a plate such as in a general printing. However, the image forming method which optimizes the advantages of the present invention is nothing else than an ink-jet method.

The surface of the intermediate transfer body 1 (surface of the elastic layer 2) is sufficiently hydrophilized by the action of the added water-soluble surfactant. Thus, when the ink-jet recording is performed using a water-based ink, the image can be formed without ink repelling or while the ink is inhibited from repelling. However, in a case of performing high speed recording, when the subsequent droplet of ink contacts with the droplet of ink precedingly provided on the intermediate transfer body before the preceding droplet is sufficiently dried to have the reduced fluidity, beading or bleeding occur, thus resulting in the distortion of an image in some cases. To prevent or alleviate these troubles, it is effective, in practice, to previously apply a reaction liquid on the intermediate transfer body 1 to react with an ink for reducing the fluidity of the ink including a color material.

When the apparatus shown in FIG. 1 is used, the reaction liquid is applied on the intermediate transfer body 1 by means of the application device 4. The term “react” used here includes the case where the color material, resin and the like which are a part of the composition constituting the ink, chemically react with one another, or are physically adsorbed to one another, thereby an increase in the viscosity of the whole ink is recognized. In addition to the above, the term “react” includes the case where an increase in viscosity locally occurs by the aggregation of the solid content of the composition of the ink.

As described above, the reaction liquid is a material for reducing the fluidity of the coloring ink. Specifically, the reaction liquid contacts with an ink to reduce the fluidity of the ink on the intermediate transfer body, thus serving to hold the ink impacted on the intermediate transfer body in the position as close as possible to the impacting position. In this manner, when the fluidity of the ink landed on the intermediate transfer body 1 having the ink-repelling property is reduced, the occurrence of beading and bleeding can further be alleviated. In other words, with the use of the reaction liquid, the ink reacts with the reaction liquid. Thereby, the fluidity of the ink contacted with the reaction liquid is reduced. Accordingly, the ink impacted on the intermediate transfer body 1 having ink-repelling property can be held in the impacting position. This can inhibit the occurrence of beading and bleeding even if the droplets of ink contact with each other on the intermediate transfer body.

In an embodiment of the present invention, as described above, the water-soluble surfactant is uniformly present on the surface of the elastic layer 2. Accordingly, the reaction liquid can uniformly be present on the surface of the elastic layer 2 without repelling, or with an alleviated degree of repelling. Therefore, the above effects are completely realized. This realization is achieved because the water-soluble surfactant can uniformly be present on the surface of the elastic layer 2 by setting the relationship between the surface tension of the oil and the surface tension of the water-soluble surfactant as described above.

Japanese Patent Publication No. 3,428,689 discloses that, as described above, when the surface of the intermediate transfer body is made ink-repellent, the provided surfactant itself is also repelled in some cases. In those cases, the surfactant is nonuniformly present on the surface of the intermediate transfer body. For this reason, when the reaction liquid is provided, it is also repelled in the area where the surfactant is not present, resulting in the nonuniform presence thereon. However, in an embodiment of the present invention, the reaction liquid can be uniformly provided on the surface of the intermediate transfer body 1 owing to the above relationship.

In FIG. 1, the application device 4 for applying the reaction liquid is mounted ahead of the ink-jet recording head 5. However, the application device 4 may be mounted behind the ink-jet recording head 5, i.e., between the ink-jet recording head 5 and the pressure roller 10. In this case, the reaction liquid is provided to the formed ink image 6. Accordingly, the reaction liquid may be provided with the recording head.

It is desired that the reaction liquid to be used should be suitably selected by corresponding to the kind of the ink used to form an image. For example, a high molecular coagulant is effectively used for a dye ink. A polyvalent metal ion is effectively used for a pigment ink in which fine particles are dispersed. Furthermore, when a polyvalent metal ion is used in combination for a dye ink, it is recommended to mix a pigment component with the color identical to the color of the dye component in the ink. Alternatively, it is recommended to mix the fine particles with white or transparent color which has small effect on the color tone, or to add a water-soluble resin reactive with a metal ion.

The high molecular coagulant to be used as the reaction liquid includes, for example, cationic high molecular coagulant, anionic high molecular coagulant, nonionic high molecular coagulant, amphoteric ionic high molecular coagulant. The metal ion includes, for example, divalent metal ion such as $Ca^{2+}$, $Cu^{2+}$, $Ni^{2+}$, $Mg^{2+}$ and $Zn^{2+}$, and trivalent metal ion such as $Fe^{3+}$ and $Al^{3+}$. When these ions are applied, these ions are preferably applied in the form of an aqueous solution of the metal salt. The anionic ion of the metal salt includes $Cl^-$, $NO_3^-$, $SO_4^{2-}$, $I^-$, $Br^-$, $ClO_3^-$ and $RCOO^-$ (R is an alkyl group).

A small amount of the reaction liquid is preferably applied in view of the flow and drying property of the ink image. Accordingly, it is necessary to select the concentration and components of the reaction liquid. If the reaction is too active, the component of the reaction liquid adheres on the surface of the intermediate transfer body. As a result, the ink image is incompletely transferred, or the intermediate transfer body itself cannot be repeatedly used in some cases. Accordingly, the reaction liquid must be selected taking these situations into consideration. As an example, an aqueous solution having a concentration of the above listed metal salts of about 5% by mass to 10% by mass may be used in a general pigment ink. This solution sufficiently works out even when applied in a thin layer form.

In FIG. 1, as suitable means of applying the reaction liquid, the application device 4 in the form of a roll coater is exemplified. The present invention is not limited to this example. For example, a spray coater and blade coater can also be used. In addition, the recording head which discharges the reaction liquid by the ink-jet method can be used. An ink is preferably provided in some cases after the reaction liquid previously applied is sufficiently dried by performing the drying process. In such a case, the drying means may be mounted between the application device 4 and the ink-jet recording head 5.

To improve the toughness of the finally formed image, a water-soluble resin and a water-soluble cross-linking agent can be also added to the reaction liquid. The material to be used is not limited if it is able to coexist with the reaction liquid. As the water-soluble resin, for example, PVA, PVP and the like are suitably used. When oxazoline, carbodiimide, aziridine, or the like is used as the water-soluble cross-linking agent, the agent reacts with carboxylic acid suitably used in an ink for the dispersion of the color material, thereby high toughness is obtained.

To uniformly apply the reaction liquid, the surfactant can be added to the reaction liquid, and the water-soluble surfactant added to the intermediate transfer body or other kind of a surfactant can be provided using the application device 3 before the reaction liquid is provided. In this case, the material which cannot be provided due to repelling when the surface of the intermediate transfer body is untreated, can uniformly be provided because the surface of the intermediate transfer body 1 is caused to be sufficiently hydrophilized by the previously added surfactant.

The ink-jet recording head 5 used to form an image is not particularly limited with respect to an ink ejection method and a form thereof. In addition to the continuous method, the on-demand method using an electric heat conversion element (heater element), and an electric mechanical conversion element (piezo element) can also be used to eject an ink. As the form of the ink-jet recording head 5, the ink-jet head formed in a line head form having ink outlets arranged in the axial direction of the intermediate transfer body 1 (in a direction perpendicular to the drawing) can be used regarding to, for example, the construction shown in FIG. 1. Moreover, the head having ink outlets arranged in the predetermined area located in the tangential or circumferential direction of the intermediate transfer body 1 may be used to perform recording while scanning the head in the axial direction. Furthermore, a certain number of heads can be used which corresponds to the number of the colors of the ink used for the formation of an image.

The ink used to form an image is also not particularly limited. The dye and the pigment as the color materials of the ink, as well as the ink for the formation of an image produced by dissolving and/or dispersing these materials are generally used. In addition, a various kinds of patterning inks for various industries can be used without any problem. The description will hereinafter be made using the ink for forming an image. The ink for forming an image also includes a water-based ink, and nonwater-based ink. Both can be used, but the water-based ink is preferably used in view of environmental safety.

To be specific, the dye is not limited, and C. I. direct blue 6 and the like, C. I. acid blue 9 and the like, C. I. direct red 1 and the like, C. I. acid red 1 and the like can be used. Moreover, C. I. direct yellow 12 and the like, C. I. acid yellow 1 and the like, C. I. food black 1 and the like, and C. I. acid black 2 may be used.

The pigment is not limited. For example, C. I. pigment blue 1 and the like, C. I. pigment red 5 and the like, C. I. pigment yellow 1 and the like, carbon black No. 2300 and the like, MCF 88 (available from Mitsubishi Kasei Corporation) can be used. Moreover, RAVEN1255 (available from Columbian Chemicals Company), REGAL330R and the like, MOGUL (available from CABOT Supermetal K.K.), Color Black FW 1 and the like, and Printex 35 (available from Degussa Co., Ltd) may also be used.

These pigments are not limited in a form. For example, any of a self-dispersion type, a resin dispersion type, a micro capsule type and the like can be used. As a dispersing agent used for the pigment of the above types, a dispersion resin which is water-soluble, and which has a weight average molecular weight of about 1,000 to 15,000 can preferably used. Such a resin is not specifically limited, and includes, for example, water-soluble vinyl resin, styrene and the derivatives thereof.

To improve the toughness of the finally formed image, a water-soluble resin and a water-soluble cross-linking agent can be added. The material to be used is not limited if it can coexist with ink components. As the water-soluble resin, the further addition of the above dispersion resin is suitably used. As the water-soluble cross-linking agent, oxazoline and carbodiimide having slow responsivity are suitably used in view of the stability of the ink.

An organic solvent can be contained in a water-based liquid medium which constructs an ink with the above described color materials. The amount of the organic solvent is a factor which determines the physical property of the ink in transferring. In the method in which the intermediate transfer body according to the present invention is used, the ink which is about to be transferred to a recording medium includes almost only the color material and a high-boiling-point organic solvent. Accordingly, a design is made taking into consideration of the most optimum value of the amount of the included organic solvent. As the organic solvent used, the materials as described below, which have a high boiling point and low vapor pressure, and which are water-soluble, are preferable.

The organic solvent used is not limited, and includes glycols such as polyethylene glycol and polypropylene glycol, ethylene glycol monomethyl ether, diethylene glycol monomethyl ether, glycerine and the like. Moreover, a mixture of two or more species selected from the above substances can be used. As the component for controlling the viscosity, the surface tension and the like, alcohols such as ethyl alcohol and isopropyl alcohol, and various kinds of surfactants can also be added in the ink.

The compounding ratio of components constituting the ink is not limited, and can properly be controlled in a range that allows the ink to be discharged, taking into consideration of the ability of the selected ink-jet head to discharge an ink, the diameter of the nozzle, and the like. In general, an ink constituted by a color material of 0.1% to 10% by mass, a solvent of 5% to 40% by mass, surfactant of 0.01% to 5% or less by mass, and pure water for the remaining can be used.

2.3 Process (c)

The present process is a process of transferring the ink image 6 formed on the intermediate transfer body 1 to the recording medium 9. In the apparatus in FIG. 1, the paper is shown in the form of a continuous paper such as a roll paper and a fanfold paper, and can be used in the form of a cut sheet without any problem. The recording medium 9 is contacted with the image-forming surface of the intermediate transfer body 1 by the pressure roller 10 to accept the ink. With reference to the form shown in FIG. 1, at this stage, the water content in the ink is evaporated from the intermediate transfer body 1 as a time passes, thereby the ink is so concentrated as to have higher viscosity. As a result, a high quality image can be formed even on a recording medium which absorbs a small amount of an ink.

However, if the time period from the formation of an ink image to the transfer thereof is extremely short, it is considered that the water content in the ink is not reduced in some cases to the amount acceptable in a recording medium by natural evaporation. Taking such cases into consideration, in the image forming apparatus shown in FIG. 1, an air-blower type of the water content removal acceleration device 7 (a warm-air blower is accepted) is disposed between the position in which an ink image is formed and the position in which the transfer thereof is performed in order to accelerate the removal of the water content in the ink. As the means of accelerating the removal of the water content, in addition to the above, for example, a heater which serves to heat from the ink image-forming surface side may be used. Furthermore, the heating roller 8 which contacts with the back side of the hollow intermediate transfer body 1 can be used to perform heating.

Moreover, the recording medium on which an image has been recorded via the intermediate transfer body 1 as described above is pressed by the fixing roller 11 to have the excellent surface smoothness. If the fixing roller 11 is used while being heated, the printed product is instantly caused to have toughness.

In the apparatus shown in FIG. 1, the intermediate transfer body 1 which has transferred an ink image is cleaned by the cleaning unit 12 disposed at the next stage in preparation for the subsequent image reception. As the cleaning means, a direct cleaning such as a showering wash with water, a water wiping and contacting with a water surface, or a wiping method such as the abutting of a wet morton roller to the surface of the intermediate transfer body 1 is preferably used. As another method, an adhesive film or an adhesive roller can be contacted with the intermediate transfer body 1 to clean the intermediate transfer body 1 without using water. As a matter of course, these can be used in combination.

In addition, the morton roller dried after the cleaning can be abutted to the intermediate transfer body as necessary to effectively dry the surface of the intermediate transfer body. Alternatively, for this purpose, air blowing can also effectively be performed.

3. Examples Of Control System And Control Procedure

When the image forming apparatus shown in FIG. 1 is constructed using the devices in each section employed in the above described embodiment, a control system can be constructed in a manner as described below.

Figure 2:
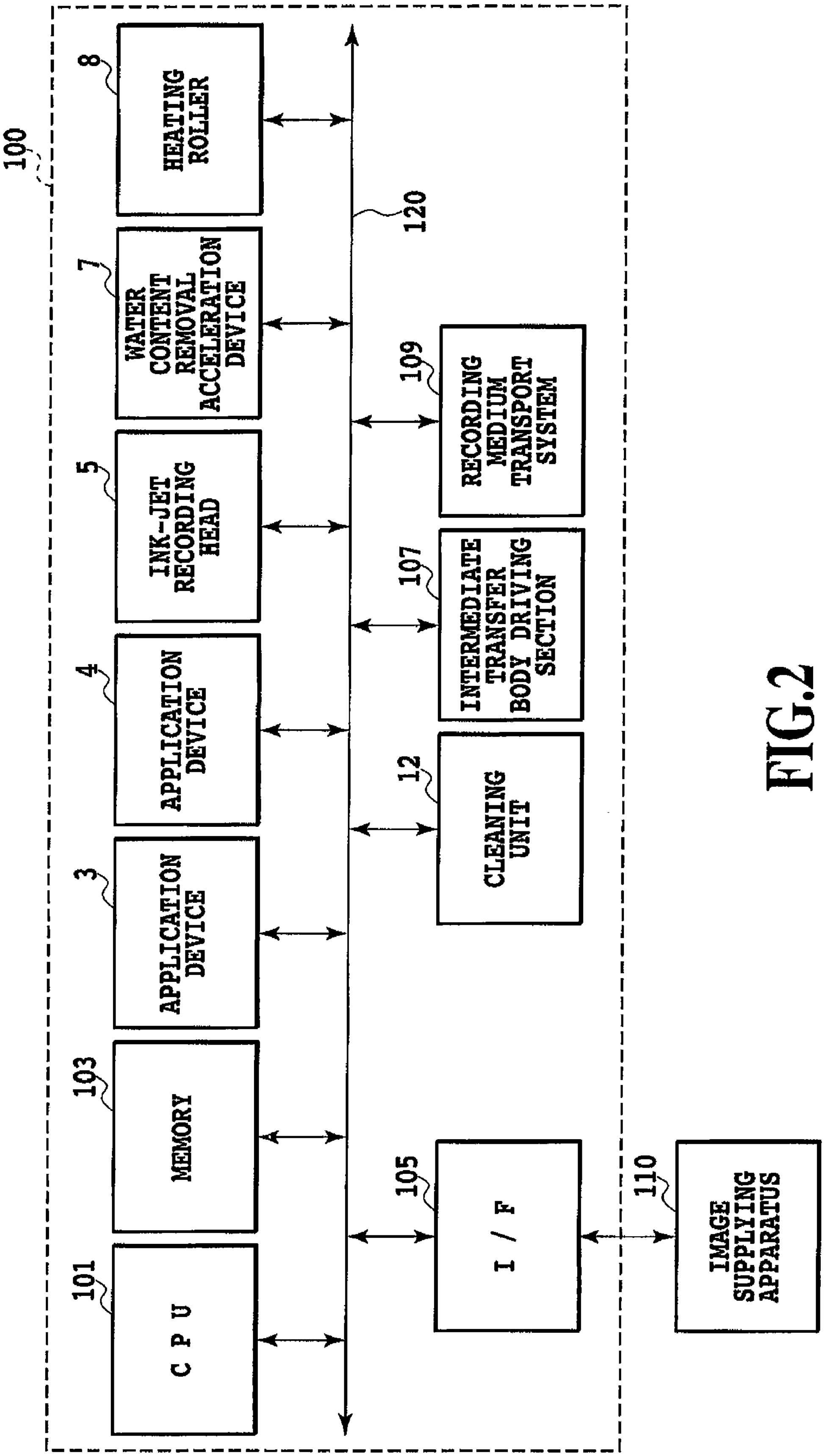
FIG. 2 is a block diagram showing an example of the control system which can be configured corresponding to the image forming apparatus of FIG. 1.

FIG. 2 shows an example of a control system which can be constructed by corresponding to the image forming apparatus in FIG. 1. In image forming apparatus indicating the entire sections by a symbol 100, a reference numeral 101 indicates a CPU which serves as the main controller of the entire system to control each section. A reference numeral 103 indicates a memory, which includes, for example, a ROM for storing the basic program of the CPU 101 as well as a RAM used for temporary storage of various data, for the processing of image data and for other works. A reference numeral 105 indicates an interface which is used for receiving and sending information such as data and command from and to an image supplying apparatus 110. The image supplying apparatus 110 is a supply source of image data, and takes a form of a host computer or others.

A reference numeral 107 indicates a drive section which causes the intermediate transfer body 1 to be rotatably driven in the above processes (a) to (c). A reference numeral 109 indicates a transport system for the recording medium 9, which includes, for example, drive sections of the pressure roller 10 and the fixing roller 11. A reference numeral 120 indicates a bus line, which connects, for example, in addition to the above each device, the application device 3, the application device 4, the ink-jet recording head 5, the water content removal acceleration device 7, the heating roller 8 and the cleaning unit 12, and which transmits control signals from the CPU 101. In each section to be controlled, a state detection sensor is disposed. The detected signals can be transmitted to the CPU 101 via the bus line 120.

Figure 3:
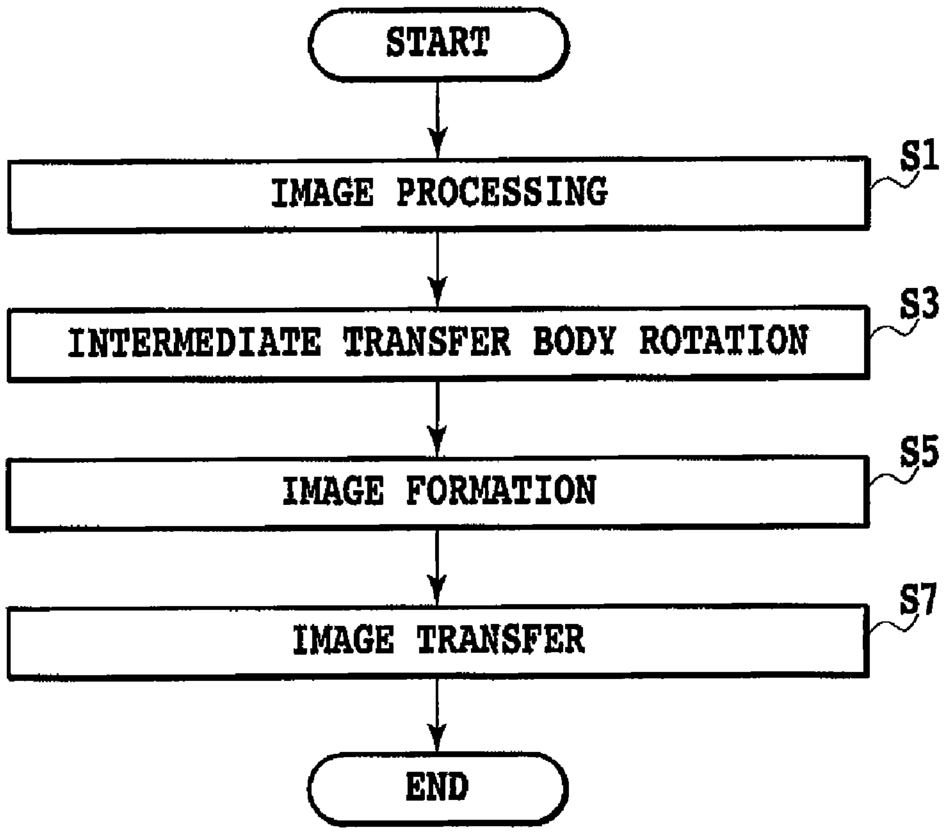
FIG. 3 is a flowchart showing an example of a procedure of image forming processing using the control system of FIG. 2.

FIG. 3 is a flowchart showing an example of the procedure of image forming processing using such a control system.

When an image data is transmitted from the image supplying apparatus 110 to instruct the recording, firstly, a required image processing of the transmitted image data is performed for the formation of an image by the ink-jet recording head 5 (step S1). Unless the image supplying apparatus transmits a previously mirror-inverted data, the inverting processing can be included in this image processing.

When the ink-jet recording head 5 completes the preparation for the image formation, the intermediate transfer body 1 is rotated (step S3) to drive the application devices and the ink-jet recording head 5 related to the process (b) of forming an image on the intermediate transfer body 1 (step S5). Subsequently, the driving is performed of the water content removal acceleration device 7, the heating roller 8, the recording medium transport system 109 and the cleaning unit 12 (step S7) related to the process (c) of transferring an ink image to the recording medium 9. In this case, each section is synchronously driven so that an image is formed after surface modification is achieved, and that the position at which an image has been formed is aligned with the position on a recording medium at which the image is to be transferred. If the ink-jet recording head 5 is of a serial recording type, an image is formed while the main scanning of the ink-jet head and the rotation of the predetermined amount of the intermediate transfer body 1 are alternately repeated. When the processing of the instructed amount of the image data is completed, the present procedure is ended.

As described above, according to the present invention, it is possible to record a high quality image on various kinds of recording media without depending on the absorption amount of an ink on the recording media. Also, the present invention makes it possible to form an image that effectively utilizes the advantage of the ink-jet recording method having an excellent recording flexibility that allows a desired printed product to be obtained instantly.

4. SPECIFIC EXAMPLES

Some Examples are hereinafter described. Each recording manner is specifically described along each process. In the following description, “parts” and “%” are based on mass unless otherwise specified.

(4.1) Example 1

(a) Production of Transfer Body

In the present Example, NBR was used as the raw material of intermediate transfer body. Only a small amount of oil component oozes in a case of a usual non-treated NBR. For this reason, 10% of a silicone oil (TSF451-100 available from GE Toshiba Silicon Co., Ltd., surface tension 20.9 mN/m) was added to a raw material rubber. Furthermore, 7% of a surfactant (SURFLON S121 available from SEIMI CHEMICAL Co., Ltd, surface tension 16.2 mN/m-water 0.1%) was added to the raw material rubber. A vulcanizing agent, an accelerator, an anti-aging agent, a reinforcement agent, a filler, a plasticizer, an adhesive agent and a coloring agent were added to the above mixture in a usual blending ratio which provides a rubber hardness degree of 60°. The mixture was then refined. The surface layer of the intermediate transfer body was produced by forming the refined raw material rubber of 0.2 mm thick in a planar form on an aluminum plate (base) having a thickness of 0.2 mm on the surface of which an adhesive agent was applied after calender operations, and then vulcanizing the raw material rubber.

The above product was wound and fixed on a drum made of aluminum to form an intermediate transfer body.

(b) Image Formation on Intermediate Transfer Body

Subsequently, in the ink-jet recording section (nozzle density 1200 dpi (dot/inch; reference value), ejected amount of 5 pl, driving frequency 12 kHz), a mirror-inverted character image was formed on the intermediate transfer body using a water-based ink having the composition described below. In this case, when the recorded image was formed on the intermediate transfer body, beading did not occur.

| Composition of ink | |
|---|---|
| Dye | 4 parts |
| Black: CI. food black 2 | |
| Organic solvent | |
| Glycerine | 10 parts |
| Diethylene glycol | 5 parts |
| Surfactant | 1 part |
| (acetylenol EH: available from Kawaken Fine Chemicals Co., Ltd.) | |
| Ion-exchange water | 80 parts |

(c) Transfer

The intermediate transfer body, on the surface of which the character image was formed, was contacted with a recording medium having high ink-absorption property (office planner available from: Canon Inc., plain paper) by means of a pressure roller to transfer the image recorded on the intermediate transfer body. At this time, beading was not found in the image on a printing paper, thus a high quality character image was obtained. In addition, the recording medium on which an image was formed was not corrugated, and thus the deterioration of quality was not found. Almost no residual ink was found on the surface of the intermediate transfer body after the transfer. Even if the subsequent image was accepted, an adverse effect was not found.

(4.2) Example 2

(a) Production of Transfer Body

In the present example, a mirable type silicone rubber having a rubber hardness degree of 50° (KE505-U available from Shin-Etsu Chemical Co., Ltd.) was used as a raw material of an intermediate transfer body. This silicone rubber generates sufficient oil bleed even if an oil is not added. For this reason, only 10% of a water-soluble surfactant (SURFLON S141 available from SEIMI CHEMICAL Co., Ltd, surface tension 15.5 mN/m-water 0.1%) was added to the raw material rubber. A minute amount of an oil component which oozes from the silicone rubber has a surface tension of about 22 mN/m. The surface tension of the added water-soluble surfactant is sufficiently lower than this value.

A predetermined amount of a vulcanizing agent was added to the above rubber raw material, and this mixture was refined. Then, the product was formed in a planar form with a thickness of 0.2 mm on an aluminum plate (base) with a thickness of 0.2 mm which had been primer-treated on the surface thereof, and was vulcanized.

This was wound and fixed on a drum made of aluminum to produce an intermediate transfer body.

(b) Image Formation on Intermediate Transfer Body

Subsequently, a reaction liquid having the following composition was applied in a thin film form with a thickness of about 1 micron on the surface of the intermediate transfer body using a roll coater. In an ink-jet recording section (nozzle density 1200 dpi, ejected amount 5 pl, driving frequency 10 kHz), a mirror-inverted photo image (average duty: about 130%) was then formed using inks of four colors having the following composition. In this case, beading and bleeding did not occur when a recorded image was formed on the intermediate transfer body.

| Composition of reaction liquid | |
|---|---|
| Metal salt | 5 parts |
| (aluminum chloride hexahydrate: reagent) | |
| Surfactant | 0.5 parts |
| (acetylenol EH available from Kawaken Fine Chemicals Co., Ltd.) | |
| Organic solvent | 10 parts |
| (diethylene glycol: reagent) | |
| Ion-exchange water | 84.5 parts |
| Composition of ink | |
| Pigment | 3 parts |
| Black: carbon black (MCF88 available from Mitsubishi Chemical Corporation) | |
| Cyan: pigment blue 15 | |
| Magenta: pigment red 7 | |
| Yellow: pigment yellow 74 | |
| Dispersion resin | 1 part |
| Styrene-acrylic acid-ethyl acrylate copolymer (acid value 240, weight average molecular weight 5000) | |
| Organic solvent | |
| Glycerin | 5 parts |
| diethylene glycol | 5 parts |
| Surfactant | 1 part |
| (acetylenol EH available from Kawaken Fine Chemicals Co., Ltd.) | |
| Ion-exchange water | 85 parts |

(c) Transfer

Firstly, the air was blown on the surface of the recorded image on the intermediate transfer body using air-blowing device mounted between the ink-jet recording section and a pressure roller. Thereafter, the intermediate transfer body was contacted with a recording medium which does not have ink absorption property (PET film having an untreated surface available on the market) using the pressure roller to transfer the recorded image. As a result, a high quality image without defects of beading and bleeding was obtained on the PET film on which an image was not be able to be formed by a usual direct recording method.

(4.3) Example 3

(a) Production of Transfer Body

In the present Example, a two-liquid RTV type silicone rubber having a rubber hardness degree of 40° (KE-12 available from Shin-Etsu Chemical Co., Ltd.) was used as a raw material of an intermediate transfer body. This silicone rubber generates sufficient oil bleed even if an oil is not added. For this reason, only 10% of a water-soluble surfactant (SURFLON S131 available from SEIMI CHEMICAL Co., Ltd, surface tension 15.5 mN/m-water 0.1%) was added to the raw material rubber. An oil component which oozes from the silicone rubber has a surface tension of about 20 mN/m. The surface tension of the added water-soluble surfactant is sufficiently lower than this value.

A predetermined amount of a curing agent was added to the above rubber raw material, and this mixture was kneaded. Then, the product was applied and formed in a planar form with a thickness of 0.2 mm on an aluminum plate (base) with a thickness of 0.2 mm which had been primer-treated on the surface thereof.

The above product was cured, and then wound and fixed on a drum made of aluminum to form an intermediate transfer body.

(b) Image Formation on Intermediate Transfer Body

Subsequently, a reaction liquid having the following composition was applied in a thin film form with a thickness of about 0.7 micron on the surface of the intermediate transfer body using a roll coater. In an ink-jet recording section (nozzle density 1200 dpi, discharged amount 5 pl, driving frequency 12 kHz), a mirror-inverted photo image (average duty: about 130%) was then formed using inks of four colors having the same composition as those of the Example 2. In this case, beading and bleeding did not occur when a recorded image was formed on the intermediate transfer body.

| Composition of reaction liquid | |
|---|---|
| Metal salt (calcium chloride dihydrate: reagent) | 10 parts |
| Surfactant (acetylenol EH available from Kawaken Fine Chemicals Co., Ltd.) | 0.5 parts |
| Organic solvent (diethylene glycol: reagent) | 20 parts |
| Ion-exchange water | 69.5 parts |

(c) Transfer

Firstly, the evaporation of the moisture in the ink image on the intermediate transfer body was accelerated using a heating roller (surface temperature 50° C.) and warm air-blowing device mounted at a contact position on the back surface of the intermediate transfer body. Thereafter, the intermediate transfer body was contacted with a recording medium which has little ink absorption property (printing paper AURORA COAT, size A, ream weight 40.5 kg, available from Nippon Paper Industries Co., Ltd.) using a pressure roller to transfer the recorded image. As a result, a high quality image without beading and bleeding was obtained on a printing paper on which an image was very difficult to form by a usual direct recording method.

Subsequently, a slight amount of a residual ink on the intermediate transfer body was removed by contacting with a wet morton roller. At this time, the residual ink was easily able to be removed.

(4.4) Comparative Example 1

As a comparative example, an image was formed using an intermediate transfer body which had been formed without the addition of a water-soluble surfactant. Comparison was made in quality between both images.

(a) Production of Transfer Body

A predetermined amount of a curing agent was added to the two-liquid RTV type silicone rubber having a rubber hardness degree of 40° (KE-12 available from Shin-Etsu Chemical Co., Ltd.) used in Example 3, and the mixture was then kneaded. The kneaded matter was applied on an aluminum plate (base) having a thickness of 0.2 mm which had been primer-treated on the surface thereof, and formed in a planar form with a thickness of 0.2 mm.

This was wound and fixed on a drum made of aluminum to form an intermediate transfer body.

(b) Image Formation on Intermediate Transfer Body

The same reaction liquid as that used in Example 3 was applied on the intermediate transfer body under exactly the same conditions as those used in Example 3. In the same ink-jet recording section, the same photo image as that formed in Example 3 was formed. In this case, the ink on the intermediate transfer body was so repelled as to form a low quality image having an apparently low density and very low graininess.

(c) Transfer

In the same manner as that of Example 3, the air was blown on the surface of the recorded image on the intermediate transfer body using air-blowing device mounted between the ink-jet recording section and the pressure roller. Thereafter, the intermediate transfer body was contacted with the printing paper with little ink absorption property, which was subjected to surface coating (Npi COAT, size A, ream weight 40.5 kg, available from Nippon Paper Industries Co., Ltd.) using the pressure roller to transfer the recorded image. Although the transfer was carried out, the image quality was not changed.

(4.5) Comparative Example 2

As a comparative example, an image was formed using an intermediate transfer body which had been produced with addition of a water-soluble surfactant having a surface tension higher than that of oil (surface tension higher than 1.1 times of that of oil). Comparison was made in quality between both.

(a) Production of Transfer Body

10% of a water-soluble surfactant (SILWET L-7001 available from Nippon Unicar Company Limited, surface tension 30.5 mN/m-water 0.1%) was added to a raw material rubber of the two-liquid RTV type silicone rubber having a rubber hardness degree of 40° (KE-12 available from Shin-Etsu Chemical Co., Ltd.) used in Example 3. The oil which oozes from this silicone rubber has a surface tension of about 20 mN/m. The surface tension of the added water-soluble surfactant is higher than this value. That is, the surface tension of the water-soluble surfactant is higher than 1.1 times of that of the oil.

A predetermined amount of a curing agent was added to the above mixture, and the mixture was kneaded. The kneaded matter was applied on an aluminum plate (base) having a thickness of 0.2 mm which had been primer-treated on the surface thereof, and formed in a planar form having a thickness of 0.2 mm.

This was wound and fixed on a drum made of aluminum to form an intermediate transfer body.

(b) Image Formation on Intermediate Transfer Body

The same reaction liquid as that used in Example 3 was applied on the intermediate transfer body under exactly the same conditions as those used in Example 3. In the same ink-jet recording section, the same photo image as that formed in Example 3 was formed. In this case, the ink on the intermediate transfer body was so repelled as to form a low quality image having an apparently low density and very low graininess. This image had almost the same degree of quality as that formed in Comparative Example 1. The effect of the surfactant was not recognized.

(c) Transfer

In the same manner as that of Example 3, the air was blown on the surface of the recorded image on the intermediate transfer body using air-blowing device mounted between the ink-jet recording section and the pressure roller. Thereafter, the intermediate transfer body was contacted with the printing paper having a low ink absorption property which was subjected to surface coating (Npi COAT, size A, ream weight 40.5 kg, available from Nippon Paper Industries Co., Ltd.)

using the pressure roller to transfer the recorded image. Although the transfer was carried out, the image quality was not changed.

(4.6) Comparative Example 3

As an example of the conventional technique, an image was formed by the method in which a silicone rubber kneaded with a surfactant had been was used, and in which a reaction liquid was not used. Comparison was made in quality. Note that, in this comparative example, as described below, the surfactant having a considerably higher surface tension than that of the oil content in the silicone rubber was kneaded in the silicone rubber.

(a) Production of a Transfer Body

10% of a surfactant (SILWET FZ-2164 available from Nippon Unicar Company Limited, surface tension 34.3 mN/m-water 0.1%, HLB value=8) was added to the raw material rubber of the two-liquid RTV type silicone rubber having a rubber hardness degree of 40° (KE-12 available from Shin-Etsu Chemical Co., Ltd.) used in Example 3. The oil content which oozes from this silicone rubber has a surface tension of about 20 mN/m. The surface tension of the added water-soluble surfactant is higher than this value.

A predetermined amount of a curing agent was added to the above mixture, and the mixture was kneaded. The kneaded matter was applied on an aluminum plate (base) having a thickness of 0.2 mm which had been primer-treated on the surface thereof, and formed in a planar form having a thickness of 0.2 mm.

This was wound and fixed on a drum made of aluminum to form an intermediate transfer body.

(b) Image Formation on an Intermediate Transfer Body

The same reaction liquid as that used in Example 3 was applied on the intermediate transfer body under exactly the same conditions as those used in Example 3. In the same ink-jet recording section, the same photo image as that formed in Example 3 was formed. In this case, the ink on the intermediate transfer body was so seriously repelled as to form such a low quality image having an apparently low density and that the image was not able to be recognized as an image having very high graininess. This image had a quality dramatically lower than those formed in Comparative Examples 1 and 2.

(c) Transfer

In the same manner as that of Example 3, the air was blown on the surface of the recorded image on the intermediate transfer body using air-blowing device mounted between the ink-jet recording section and the pressure roller. Thereafter, the intermediate transfer body was contacted with the printing paper having a low ink absorption property which was subjected to surface coating (Npi COAT, size A, ream weight 40.5 kg, available from Nippon Paper Industries Co., Ltd.) using the pressure roller to transfer the recorded image. Although The transfer was carried out, the image quality was not improved.

(4.7) Example 4

A. Production of Transfer Body

Various kinds of surfactants having different surface tensions were added by 10% to the raw material silicone rubber used in Example 3 to produce an intermediate transfer body in the same manner as that of Example 3.

B. Image Formation on Intermediate Transfer Body

The same reaction liquid as that used in Example 3 was applied on the intermediate transfer body under exactly the same conditions as those used in Example 3. In the same ink-jet recording section, the same photo image as that formed in Example 3 was formed. The following table shows the judgment results by visual observation on the evaluation of the images formed on the intermediate transfer body, rating the judgment results at E (excellent), A (allowable range) and P (poor).

TABLE 1

| Types of surfactants added to raw material rubber | Surface tensions when water contains 0.1% of surfactant (mN/m) | Ratio of surface tension of surfactant (A) to surface tension of oil (B), i.e., value of A/B | Image evaluation |
|---|---|---|---|
| SURFLON S141 (available from SEIMI CHEMICAL Co., Ltd.) | 15.5 | 0.775 | E |
| SURFLON S121 (available from SEIMI CHEMICAL Co., Ltd.) | 16.2 | 0.810 | E |
| SURFLON S386 (available from SEIMI CHEMICAL Co., Ltd.) | 19.5 | 0.975 | E |
| Novec FC4432 (available from 3M) | 21.0 | 1.050 | A |
| Olfine Exp4001 (available from Nissin Chemical Industry Co., Ltd.) | 26.0 | 1.300 | P |
| Olfine Exp4036 (available from Nissin Chemical Industry Co., Ltd.) | 27.5 | 1.375 | P |
| Surfynol 420 (available from Air Products and Chemicals, Inc.) | 32.0 | 1.600 | P |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-166452, filed Jun. 15, 2006, which is hereby incorporated by reference herein in its entirety.

What is claimed is:

1. A method of producing a recorded product comprising the steps of:

forming an ink image on an intermediate transfer body by providing a water-based ink thereto, the intermediate transfer body having a surface including an elastic body where an oil and a water-soluble surfactant having a surface tension not more than that of the oil are present; and transferring the formed ink image to a recording medium.

2. The method of producing a recorded product according to claim 1, wherein the oil and the water-soluble surfactant are contained in a surface layer including the surface, and wherein the oil and the water-soluble surfactant bleed out on the surface, thus being present on the surface.

3. The method of producing a recorded product according to claim 1, further comprising the step of providing the oil and the water-soluble surfactant to the intermediate transfer body prior to the step of forming, thus causing the oil and the water-soluble surfactant to be present on the surface.

4. The method of producing a recorded product according to claim 1, wherein the elastic body is a surface layer including the surface.

5. The method of producing a recorded product according to claim 4, wherein the elastic body is a silicone rubber, wherein the oil is a silicone oil, and wherein the water-soluble surfactant is a fluorinated surfactant.

6. The method of producing a recorded product according to claim 1, wherein the ink image is formed on the intermediate transfer body by causing a recording head to provide the ink to the intermediate transfer body in the step of forming.

7. The method of producing a recorded product according to claim 1, further comprising the step of providing a material reacting with the ink, to the intermediate transfer body prior to the transfer step.

8. A method of producing a recorded product comprising the steps of:

forming an ink image on an intermediate transfer body by providing a water-based ink thereto, the intermediate transfer body having a surface including an elastic body where an oil and a water-soluble surfactant having a surface tension not more than 1.1 times of that of the oil are present; and transferring the formed ink image to a recording medium.

9. A method of producing a recorded product comprising the steps of:

forming an ink image on an intermediate transfer body by providing a water-based ink thereto, the intermediate transfer body including a surface layer having an elastic body containing an oil and a water-soluble surfactant having a surface tension not more than that of the oil, wherein a recording head provides the ink to the surface layer of the intermediate transfer body; and transferring the ink image formed on the intermediate transfer body to a recording medium, wherein in the forming step, the ink is provided from the recording head to the surface layer in a state where the oil and the water-soluble surfactant are present on a surface thereof.

10. A method of producing a recorded product comprising the steps of:

forming an ink image on an intermediate transfer body by providing a water-based ink thereto, the intermediate transfer body including a surface layer having an elastic body containing an oil and a water-soluble surfactant having a surface tension not more than 1.1 times of that of the oil, wherein a recording head provides the ink to the surface layer of the intermediate transfer body; and transferring the ink image formed on the intermediate transfer body to a recording medium, wherein in the forming step, the ink is provided from the recording head to the surface layer in a state where the oil and the water-soluble surfactant are present on a surface thereof.

11. An image forming apparatus comprising:

an intermediate transfer body including a surface layer having an elastic body containing an oil and a water-soluble surfactant having a surface tension not more than 1.1 times of that of the oil;

a forming means for forming an ink image on the intermediate transfer body using a water-based ink; and a transfer section which transfers the formed ink image to a recording medium, wherein the forming means forms the ink image on the surface layer in a state where the oil and the water-soluble surfactant are present on a surface thereof.

12. An image forming apparatus comprising:

an intermediate transfer body including a surface layer having an elastic body containing an oil and a water-soluble surfactant having a surface tension not more than that of the oil;

a forming means for forming an ink image on a surface layer of the intermediate transfer body using a water-based ink; and a transfer section which transfers the formed ink image to a recording medium, wherein the forming means forms the ink image on the surface layer in a state where the oil and the water-soluble surfactant are present on a surface thereof.

13. The image forming apparatus according to claim 12, further comprising means for providing the water-soluble surfactant to the surface layer of the intermediate transfer body.

14. An intermediate transfer body on which an ink image is formed by providing a water-based ink, the intermediate transfer body comprising:

a surface layer comprising an elastic body containing an oil and a water-soluble surfactant having a surface tension not larger than that of the oil, wherein the oil and the water-soluble surfactant bleed out on the surface of the surface layer, thereby being present on the surface.

15. An intermediate transfer body on which an ink image is formed by providing a water-based ink, the intermediate transfer body comprising:

a surface layer comprising an elastic body containing an oil and a water-soluble surfactant having a surface tension not larger than 1.1 times of that of the oil, wherein the oil and the water-soluble surfactant bleed out on the surface of the surface layer, thereby being present on the surface.

16. A method of producing a recorded product comprising the steps of:

forming an ink image on an intermediate transfer body having a surface where a silicone oil and a water-soluble surfactant having a surface tension not more than that of the silicone oil are present;

transferring the formed ink image to a recording medium;

wherein the intermediate transfer body has an elastic body containing the silicone oil and the water-soluble surfactant; and wherein the silicone oil and the water-soluble surfactant bleed out on the surface from the inside of the elastic body, thus being present on the surface.

* * * * *